United States Patent
de Moura et al.

(10) Patent No.: US 8,103,674 B2
(45) Date of Patent: Jan. 24, 2012

(54) E-MATCHING FOR SMT SOLVERS

(75) Inventors: Leonardo M. de Moura, Sammamish, WA (US); Nikolaj S. Bjorner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 11/962,847

(22) Filed: Dec. 21, 2007

(65) Prior Publication Data

US 2009/0164501 A1    Jun. 25, 2009

(51) Int. Cl.
*G06F 17/30* (2006.01)
(52) U.S. Cl. .......................... 707/741; 706/48
(58) Field of Classification Search .......... 707/741; 703/22; 706/48; 717/124
See application file for complete search history.

(56) References Cited

U.S. PATENT DOCUMENTS

| | | | |
|---|---|---|---|
| 5,978,790 A * | 11/1999 | Buneman et al. | 1/1 |
| 5,978,801 A * | 11/1999 | Yuasa | 1/1 |
| 6,343,376 B1 | 1/2002 | Saxe et al. | |
| 6,385,617 B1 | 5/2002 | Malik | |
| 6,389,576 B1 | 5/2002 | Lam et al. | |
| 6,424,962 B1 | 7/2002 | Billon | |
| 7,036,115 B2 * | 4/2006 | Nelson | 717/151 |
| 7,120,569 B2 | 10/2006 | Arroyo-Figueroa | |
| 7,194,710 B2 | 3/2007 | Prasad et al. | |
| 7,440,942 B2 * | 10/2008 | Dixon et al. | 1/1 |
| 7,653,520 B2 * | 1/2010 | De Moura et al. | 703/2 |
| 2004/0260683 A1 * | 12/2004 | Chan et al. | 707/3 |
| 2005/0010581 A1 * | 1/2005 | Doan | 707/100 |
| 2005/0187900 A1 * | 8/2005 | LeTourneau | 707/1 |
| 2006/0282453 A1 * | 12/2006 | Tjong et al. | 707/102 |
| 2007/0255748 A1 * | 11/2007 | Ferragina et al. | 707/102 |

OTHER PUBLICATIONS de Moura, Developing Efficient SMT Solvers, May 2007, pp. 1-101.*
Hillenbrand et al., On the Evaluation of Indexing Techniques for Theorem Proving, 2001, pp. 257-271.*
Hoffman et al., Pattern Matching in Trees, Jan. 1982, pp. 68-95.*
de Moura, SMT Solvers: Theory & Practice, 2006, pp. 1-113.*
Ranise et al., The SMT-LIB Standard: Version 1.2, Aug. 5, 2006, pp. 1-43.*
de Moura et al., Efficient E-Matching for SMT Solvers, Sep. 4, 2007, pp. 1-20.*
Davis, Martin, "A Computing Procedure for Quantification Theory", Sep. 1959, pp. 201-215.
Bryant, Randal E., "Graph-Based Algorithms for Boolean Function Manipulation", IEEE Transactions on Computers, 40-2, pp. 205-213, Feb. 1997.
Davis, Martin, et al., "A Machine Program for Theorem-Proving", Institute of Mathematical Sciences, New York University, Communications of the ACM, Jun. 1961, pp. 394-397.
Bryant, Randal E., et al., "Microprocessor Verification Using Efficient Decision Procedures for a Logic of Equality with Uninterpreted Functions", 13 pages, Tableaux '99, Jun. 1999.

(Continued)

*Primary Examiner* — James K. Trujillo
*Assistant Examiner* — Jorge A Casanova
(74) *Attorney, Agent, or Firm* — Workman Nydegger

(57) ABSTRACT

Embodiments are introduced which provide for creation of an E-matching code tree index which works on E-graphs to make E-matching more efficient. Use of the E-matching code tree allows performing matching of several patterns simultaneously. Embodiments are also described which provide for the generation of inverted path indexes. An inverted path index may be used to filter an E-graph to determine terms which may potentially match patterns when an E-graph is updated.

12 Claims, 4 Drawing Sheets

OTHER PUBLICATIONS

Cook, Stephen A., "The Complexity of Theorem-Proving Procedures", pp. 151-158, Annual ACM Symposium on Theory of Computing, Proceedings of the third annual ACM symposium on Theory of computing, 1971.

* cited by examiner

E-MATCHING FOR SMT SOLVERS

CROSS-REFERENCE TO RELATED APPLICATIONS n/a

BACKGROUND

Computer programs and software are ubiquitous and are used not just to direct the functionality of conventional computers but also to control and enhance the functionality of a myriad of modern products and appliances. For instance, televisions, household appliances, cellular phones, automobiles, medical devices, and so forth, may incorporate computer programs which direct and enhance their functionality. The theoretical and practical analysis of computer programs is an important aspect of software research, development, modification, enhancement, and maintenance. The ability to analyze computer programs and reason about their execution, from both theoretical and practical perspectives, aids software developers by allowing them to make better and more informed choices during development of software and the modification or enhancement of existing software. Analysis of software is useful for proving correctness of code, for performing optimizations of existing code, for doing performance analysis and so on.

For purposes of analysis, it is often efficient and desirable to automate the reasoning about the complexity of software using tools and abstractions which can describe the properties and behavior of computer software. Computer software may often be formally described for the purposes of such analysis by specifying a set of constraints or axioms formalizing the relationships and operation of the software.

For a given set of constraints or axioms, it may be useful to reason about the implications of certain other constraints or imposed equalities within software systems. It is often desirable to reason about new constraints which are implied when equalities are imposed on a given set of initial or intermediate constraints and equalities. Formal theorem provers have been usefully employed in such reasoning and have proven to be very useful in a wide range of applications from computer software and hardware analysis, software systems requirements analysis, compiler verification. One type of prover, a Satisfiability Modulo Theories (SMT) solver, has been considered for such uses in hardware verification, analysis of algorithms, and verification of compiler correctness.

Satisfiability Modulo Theories (SMT) solvers, sometimes based upon a Davis-Putnam-Logemann-Loveland (DPLL) framework, have proven to be very useful for integrating theory reasoning for such purposes. A well known approach for incorporating quantifier reasoning with ground decision procedures has been used by the Simplify theorem prover described by Detlefs, Nelson, and Saxe. The Simplify theorem prover, for example, uses an E-matching algorithm that works against an E-graph to instantiate quantified variables. However, there are problems and limitations with the techniques and approaches employed thus far.

E-matching is known, in theory, to be NP-hard and the number of matches can be exponential in the size of the E-graph. It may be inefficient and it may consume large resources, both in time and space, to compute the matching on an E-graph to instantiate quantified variables which make up the terms and patterns of the systems being analyzed. The time and space resources necessary may grow exponentially with the number of patterns which need to be matched in a given situation. The practical overhead of using E-matching for quantifier instantiation, which is in many cases excessive, may be linked to the searching and maintaining sets of patterns that can efficiently retrieve new matches when E-graph operations introduce them.

BRIEF SUMMARY

Embodiments which are described herein introduce algorithms that identify matches on E-graphs incrementally and efficiently. In particular, particular embodiments are described which introduce an index that works on E-graphs, called E-matching code trees that combine features of substitution and code trees which are used in other, various, theorem provers. E-matching code trees allow performing matching against several patterns simultaneously. Embodiments of the invention also utilize another index called the inverted path index. In certain aspects of the embodiments described herein, E-matching code trees may be combined with this additional index, the inverted path index, so that E-graph terms may be filtered to determine which may potentially match patterns when an E-graph is updated.

Embodiments described herein include methods and processes for determining and using E-matching code trees. Embodiments described herein also include methods and processes for determining and using inverted path indices and inverted path strings. Embodiments also include systems and computer program products which may be used similarly.

Embodiments described herein include methods, computer program products, and systems for determining E-matching code trees from one or more patterns. The methods include accessing one or more patterns. Each of the patterns are compiled into a corresponding code sequence. A plurality of labeled instructions is created. The labeled instructions correspond to the code sequences compiled from the patterns. The labeled instructions are combined into a code tree corresponding to the common structure of the patterns.

Other embodiments described herein describe methods, systems, and computer program products for creating an inverted path index. One or more patterns and parent and child pair within the patterns are accessed. An inverted path index is then generated by a) creating nodes within a tree which comprise a list of branches and a set of patterns such that the nodes and branches correspond to a path from the parent to the child, and b) creating transitions between the nodes of the tree corresponding to the parent-child relationship of the patterns.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
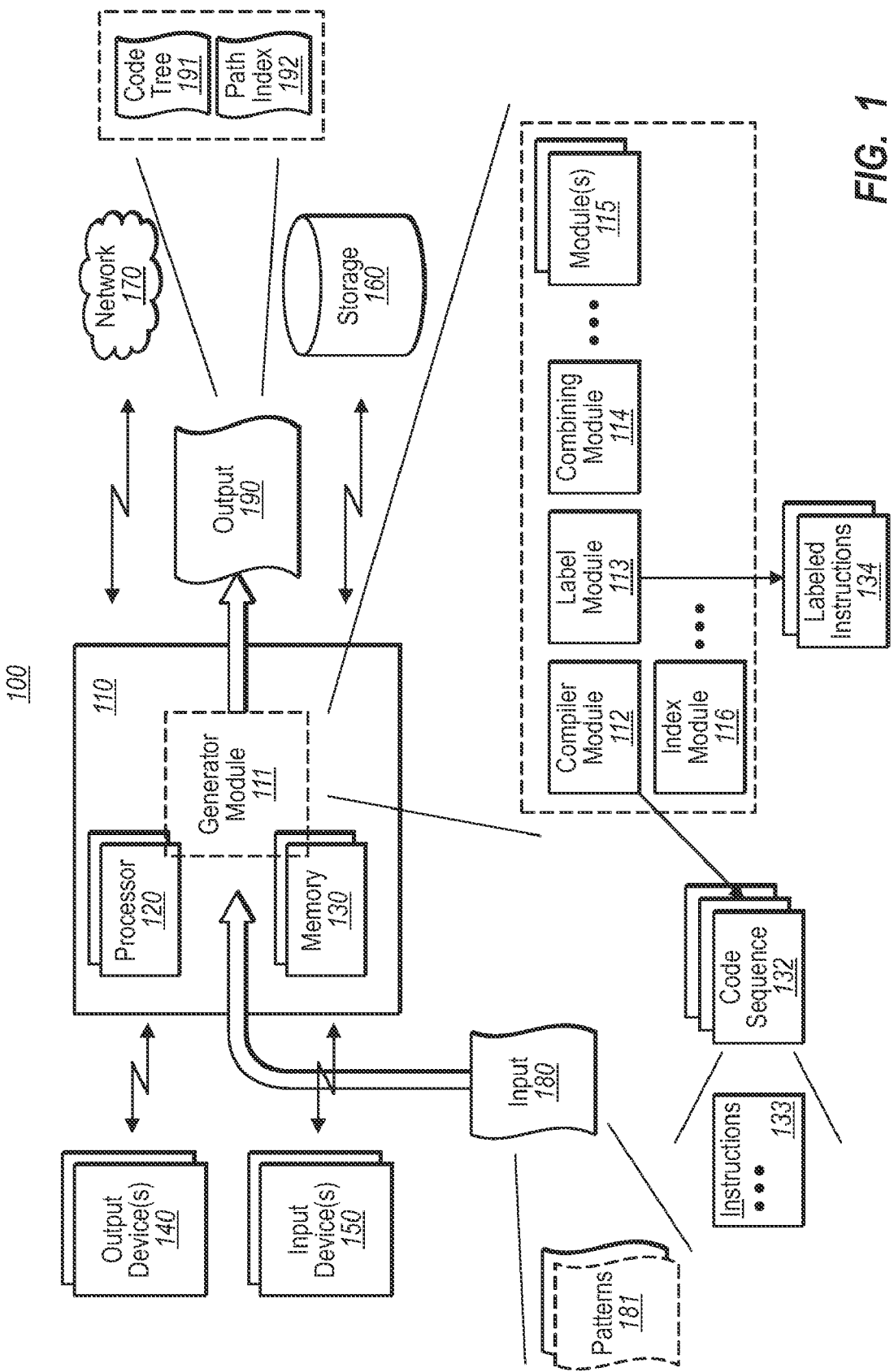
FIG. 1 illustrates an exemplary computer operating environment in which the embodiments described herein may operate.

Embodiments of the present invention extend to the determination of E-matching code trees, and to the insertion of terms, patterns, and elements into E-matching code trees. Embodiments of the present invention also extend to the determination and generation of inverted path indices and to inverted path strings.

Embodiments which are described herein introduce algorithms that identify matches on E-graphs incrementally and efficiently. In particular, certain embodiments are described which introduce an index that works on E-graphs, called E-matching code trees that combine features of substitution and code trees which are used in other, various, theorem provers. E-matching code trees allow performing matching against several patterns simultaneously. Embodiments of the invention also utilize another index called the inverted path index. In certain aspects of the embodiments described herein, E-matching code trees may be combined with this additional index, the inverted path index, so that E-graph terms may be filtered to determine which may potentially match patterns when an E-graph is updated.

Embodiments described herein include methods, computer program products, and systems for determining E-matching code trees from one or more patterns. The methods include accessing one or more patterns. Each of the patterns is compiled into a corresponding code sequence. A plurality of labeled instructions are created. The labeled instructions correspond to the code sequences compiled from the patterns. The labeled instructions are combined into a code tree corresponding to the common structure of the patterns.

Other embodiments described herein describe methods, systems, and computer program products for creating an inverted path index. One or more patterns and parent and child pair within the patterns are accessed. An inverted path index is then generated by a) creating nodes within a tree which comprise a list of branches and a set of patterns such that the nodes and branches correspond to a path from the parent to the child, and b) creating transitions between the nodes of the tree corresponding to the parent-child relationship of the patterns.

The embodiments of the present invention may comprise a special purpose or general-purpose computer including various computer hardware, as discussed in greater detail below.

Embodiments described herein include methods, computer program products, and systems for determining E-matching code trees from one or more patterns. The methods include accessing the patterns which will be used to determine the code trees. Each of the patterns are compiled into a corresponding code sequence. Labeled instructions are created where the instructions correspond to the code sequences compiled from the patterns. Labeled instructions are combined into a code tree where the tree corresponds to the common structure of the patterns.

Other embodiments described herein describe methods, systems, and computer program products for creating an inverted path index. In order to determine and create an inverted path index, one or more patterns are accessed. A parent and child pair within the patterns is also accessed or otherwise provided or identified. An inverted path index is then generated by creating nodes within a tree which comprise a list of branches and a set of patterns such that the nodes and branches correspond to a path from the parent to the child. The transitions between the nodes of the tree are created corresponding to the parent-child relationship of the patterns.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in one basic configuration, a computing system 100 may include at least one processing unit 120 and memory 130. The memory 130 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated. Modules and components may be instructions and/or data residing within memory 130 and may be methods and process being performed by processor(s) 120. It should properly be thought that embodiments of the invention may encompass and/or employ all aspects of a computing system 100.

Embodiments within the scope of the present invention also include computer-readable storage media for carrying or having computer-executable instructions or data structures stored thereon. The computer-readable media may have encoded thereon computer-executable instructions which, when executed upon appropriate computer hardware or within appropriate computing facilities, carry out the methods and processes described herein. Such computer-readable media can be any available media that can be accessed by a general purpose or special purpose computer.

By way of example, and not limitation, such computer-readable storage media can comprise physical computer-readable storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Thus, any such connection may be properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Referring to FIG. 1, an E-matching code tree may be determined or created by accessing one or more patterns. Accessing the patterns 181 may be by way of input 180 to the computing system 100. Computer system 100 may access patterns through an input device 150 or from storage 160. Once accessed, the patterns may be stored within computer memory 130. Accessed patterns may be compiled into a code sequence 132 having one or more instructions 133 by a compiler module within the computing system 110. Note that any components or modules, although described as such, do not necessarily need to be separate modules but may be part of an overall generator module 111 or other such module within the computing system 110.

The instructions of a code sequence from the accessed patterns can be labeled to create a plurality of labeled instructions 134. A labeling module 113 may be used to label the instructions of a code sequence and produce a list of labeled instructions 134. The labeled instructions 134 may also be created by an alternative appropriate module 115 within the computing system 110 or by a larger generating module 111.

A combining module 114 within the computing system 110 can combine labeled instructions into a code tree. The code tree corresponds to the common structure of the one or more patterns. After a code tree has been created, it may be output for subsequent use. The output of a created code tree may be to non-volatile storage 160, may to a destination on a network 170, or may be to any other appropriate output device 140 or to some other output 190 in an appropriate form of a code tree 191.

Referring again to FIG. 1, an inverted path index 192 may be created. Accessing the patterns 181 may be by way of input 180 to the computing system 100. Computer system 100 may access patterns through an input device 150 or from storage 160 or may be accessed from a destination reachable over a network 170. Once accessed, the patterns may be stored within computer memory 130 or in non-volatile storage 160. A pair which comprises a parent-child pair within the patterns is also accessed.

An inverted path index may be generated by an index module 116 creating nodes within a tree comprising a list of branches and a set of patterns such that the nodes and branches correspond to a path from the parent to the child. Generating of the inverted path index may be accomplished within the generator module 111 or may be accomplished by smaller, more specialized modules such as the index module 116 or other specialized modules 115. Nodes and branches for the tree are created corresponding to a path from the parent to the child. The transitions of the nodes can be created corresponding to the parent-child relationship of the patterns. Determining the transitions and labeling the node transitions may be performed by the generator module 111, by an index module 116, or by another module 115. A created inverted path index may be recorded in non-volatile storage 160, may be issued as an inverted path index 191 in output 190 in an appropriate output format.

The modules and processing units as described herein, it may be appreciated, may be any appropriate combination of computing hardware such as processors 120, computer memory 130, and/or software. The generator module 111 as indicated in FIG. 1 is depicted as encompassing a computer processor 120, system memory 130, and other resources within a computing environment as would be known in the art to support the methods and processes as described herein.

Methods and processes for performing the above steps and acts, as well as others, are more fully described throughout the discussion herein.

SMT Solvers and E-Matching

Theorem provers have been known to be very useful in a wide range of applications from computer software and hardware analysis, software systems requirements analysis, compiler verification. One type of theorem prover is known as a Satisfiability Modulo Theory (SMT) solver. In many theorem solvers, including SMT solvers, important considerations may be the amount of time it takes to solve theorems or the amount of computing resources (such as memory space or processor power) which may be required.

Many modern Satisfiability Modulo Theory (SMT) solvers combine Boolean satisfiability solvers based on the Davis-Putnam-Logemann-Loveland (DPLL) procedure, and T-solvers capable of deciding the satisfiability of conjunctions of T-atoms. Within this specification, T-atoms are equalities between ground terms, and quantified formulas. A T-solver maintains a state that is an internal representation of the atoms that have been asserted up to a particular point. This T-solver provides operations for updating the state by asserting new atoms, checking whether the state is consistent, and backtracking. The T-solver maintains a stack of checkpoints that mark consistent states to which the solver can backtrack.

Many Satisfiability Modulo Theory (SMT) solvers incorporate quantifier reasoning using E-matching. Semantically, the formula $\forall x_1, \ldots, x_n.F$ is equivalent to the infinite conjunction $\Lambda_\beta \beta(F)$ where $\beta$ ranges over all substitutions over the x's. In practice, solvers use heuristics to select from this infinite conjunction those instances that are "relevant" to the conjecture. The key idea is to treat an instance $\beta(F)$ as relevant whenever it contains enough terms that are represented in the current E-graph. That is, non ground terms p from F are selected as patterns, and $\beta(F)$ is considered relevant whenever $\beta(p)$ is in the E-graph. An abstract version of the E-matching algorithm is shown in Listing 1:

$$match(x, t, S) =$$
$$\{\beta \cup \{x \mapsto t\} \mid \beta \in S, x \notin dom(\beta)\} \cup \{\beta \mid \beta \in S, find(\beta(x)) = find(t)\}$$

$$match(c, t, S) = S \text{ if } c \in class(t)$$

$$match(c, t, S) = \emptyset \text{ if } c \notin class(t)$$

$$match(f(p_1, \ldots, p_n), t, S) =$$
$$\bigcup_{f(t_1,\ldots,t_n) \in class(t)} match(p_n, t_n, \ldots, match(p_1, t_1, S))$$

1. An E-Matching (Abstract) Algorithm

The set of relevant substitutions for a pattern p can be obtained by taking $\cup_{t \in E}$ match (p,t,∅). The abstract matching procedure returns all substitutions that E-match a pattern p with term t. That is, if β∈match(p,t,∅) then E implies β(p)=t, and conversely, if E implies β(p)=t, then there is a β'congruent to β such that β'∈match(p,t,∅). This observation is justified in more detail by observing that the abstract matcher may be viewed as a congruence proof search procedure.

It may be beneficial to make theorem proving and E-matching more efficient, both in time and in terms of computational resources. Certain aspects and embodiments of the present invention may be useful for such efficiency gains.

Some preliminary information will be helpful and useful in describing the method 300 for producing E-matching code trees. The preliminary information contains the background information, conventions, and notation used in describing embodiments and examples of the present invention.

Preliminary Information

Let Σ be a signature consisting of a set of function symbols, and V be a set of variables. Each function symbol $f$ is associated with a nonegative integer, called the arity of $f$, denoted arity($f$). If arity(g)=0, then g is a constant symbol. The set of terms T(Σ,V) is the smallest set containing all constant symbols and variables such that $f(t_1, \ldots, t_n) \in T(\Sigma, V)$ whenever $f \in \Sigma$, arity($f$)=n, and $t_1 \ldots t_n \in T(\Sigma, V)$. A f-application is a term of the form $f(t_1, \ldots, t_n)$. The set of ground terms is defined as T(Σ,∅). In our context, the set of non ground terms is called patterns. We use p, $f(p_1, \ldots p_n)$ and x, y, z to range over patterns, and t, $f(t_1, \ldots, t_n)$ and a, b, c to range over ground terms.

In our context, a substitution is a mapping from variables to ground terms. Given a substitution β, we denote by β(p) the ground term obtained by replacing every variable x in the pattern p by β(x).

A binary relation R over T is an equivalence relation if it is reflexive, symmetric, and transitive. An equivalence relation induces a partition of T into equivalence classes. Given a binary relation R, its equivalence closure is the smallest equivalence relation that contains R. A binary relation R on T(Σ,∅) is monotonic if $\langle f(t_1, \ldots, t_n), f(t_1, \ldots, t_n)\rangle \in R$ whenever $f \in \Sigma$ and $\langle t_i, t_i\rangle \in R$ for all i in 1 . . . n. A congruence relation is a monotonic equivalence relation. Given a binary relation R on T(Σ,∅), its congruence closure is the smallest congruence relation that contains R.

An E-graph data-structure maintains the congruence closure of a binary relation U={$(t_1,t_1), \ldots, (t_k,t_k)$} given incrementally (on-line) as a sequence of operations union $(t_1,t_1), \ldots,$ union$(t_k,t_k)$. Each equivalence class is represented by its representative. For each term t in the E-graph, find(t) denotes the representative of the equivalence class that contains t, class(t) denotes the equivalence class that contains t, apps$_f$(t) denotes the set of terms $f(t_1, \ldots, t_n)$ such that $f(t_1, \ldots, t_n)$∈class(t), apps($f$) denotes the set of all $f$-applications in the E-graph, parents(t) denotes the set of terms $f(\ldots, t', \ldots)$ in the E-graph such that t'∈ class(t), parents$_f$(t) is a subset of parents(t) which contains only $f$-applications, and parents$_{f,i}$(t) is a subset of parents$_f$(t) which contains only $f$-applications where the i-th argument $t_i$ is in class(t). The set ancestors(t) is the smallest set such that parents(t)⊆ancestors (t), and ancestors($t_p$)⊆ancestors(t) whenever $t_p$∈ancestors(t). In considering the above functions and definitions, it may also be assumed that there is always only one E-graph during proof search.

In certain embodiments described herein, patterns as used by theorem provers and E-matching may be compiled into codes sequences. Such code sequences may comprise one or more instructions.

Figure 2:
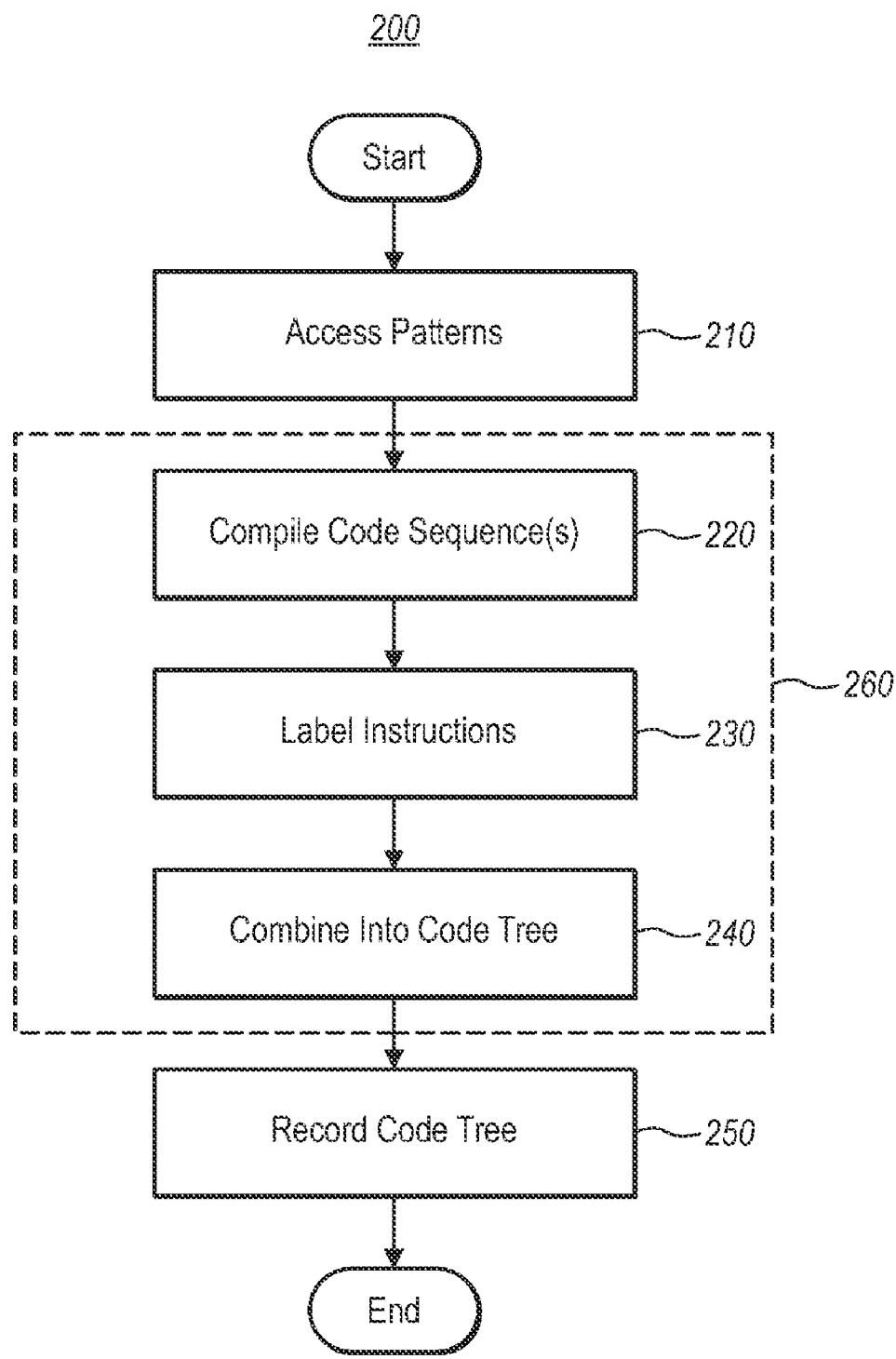
FIG. 2 illustrates a method for the creation of E-matching code trees.

By abstract instructions and the methods and processes described herein, it may be seen that there is a method for determining, creating, and producing an E-matching code tree. Such a method is illustrated in FIG. 2. The method includes accessing one or more patterns 210. For example, referring to FIG. 1, the one or more patterns 181 may be accessed in the form of input 180 to a computing system. The patterns may be accessed from storage 160 accessible to the computing system. The patterns may be accessed through input devices 150 which are available to the computing system. As may be appreciated, the patterns may be accessed by any of a number of methods known in the art.

The instructions, for example, may be defined within an abstract machine (e.g., implemented in a generator module 111). For example, an abstract machine and instructions are described herein.

An E-Matching Abstract Machine

For the purposes of embodiments described herein, it is useful to describe the instructions which may be used in compiling patterns during E-matching.

It is usual in automated deduction to compile terms into code that can be efficiently executed at retrieval time. The compiler produces code for a real machine, or for a virtual machine (as in the case of the Prolog Warren Abstract Machine (WAM)). Embodiments of the present invention will describe an abstract machine for E-matching, its instructions, compilation process, and interpretation. However, the use of an abstract machine should not be considered limiting. Embodiments described herein may also be realized on any general purpose computing machinery and the scope of the invention should be considered to encompass both the described abstract machine and the realized implementation of the abstract machine on any suitable hardware and by any suitable software.

Memory of the abstract machine may be divided in the following way:
    register pc for storing the current instruction.
    an array of registers, reg[ ], for storing ground terms.
    a stack bstack for backtracking.

The basic instruction set of an abstract machine useful in embodiments described herein consists of: init, bind, check, compare, choose, yield, and backtrack. The semantics of the abstract machine instructions are illustrated by Listing 2:

| | |
|---|---|
| init(f,next) | assuming reg[0] = $f(t_1,\ldots,t_n)$ |
| | reg[1] := $t_1$; ...; reg[n] := $t_n$ |
| | pc := next |
| bind(i,f,o,next) | push(bstack, (choose – app,o,next,apps$_f$(reg[i]),1)) |
| | pc := backtrack |

-continued

| | |
|---|---|
| check(i,t,next) | If find(reg[i]) = find(t) Then<br>  pc := next<br>Else pc := backtrack |
| compare(i,j,next) | If find(reg[i]) = find(reg[j]) Then<br>  pc := next<br>Else pc := backtrack |
| choose(alt,next) | If $^{alt \neq nil}$ Then<br>  push(bstack, (choose,alt))<br>  pc := next |
| yield($i_1$,...,$i_k$) | yield substitution $\{x_1 \mapsto reg[i_1],...,x_k \mapsto reg[i_k]\}$<br>pc := backtrack |
| backtrack | If bstack is not empty Then<br>  top := pop(bstack)<br>  Process top (FIG. 3).<br>Else stop |
| (choose,alt) | pc := alt |
| (choose – app,o,next,s,j) | If $|s| \geq j$ Then<br>  Let $f(t_1,...,t_n)$ be the $j^{th}$ term in s .<br>  reg[o] := $t_1$; ...; reg[o + n – 1] := $t_n$<br>  push(bstack, (choose – app,o,next,s,j + 1))<br>  pc := next |

2. Semantics of Abstract Machine Instructions

The semantics of these instructions, which are illustrated in Listing 2, corresponds closely to steps which may be used by an abstract matching procedure for compiling patterns. Using the abstract machine instructions, patterns may be compiled into code sequences.

Method 200 includes an act of compiling 220 each of the one or more patterns into a code sequence. For example, the compiler module 112 may be used to compile the one or more patterns 181 into the code sequences 132 including instructions 133. The code sequence may comprise any of the instructions as detailed, above, for example, in Listings 2 and, below, in Listing 4. The patterns may be compiled into code sequences by employing, for example, the process as detailed in Listing 3.

$$compile(f(p_1, \ldots, p_n)) =$$
$$init(f, compile(\{1 \mapsto p_1, \ldots, n \mapsto p_n\}, \emptyset, n + 1))$$
$$compile(\{i \mapsto t\} \cup W, V, o) = check(i, t, compile(W, V, o)),$$
when $t$ is a ground term.
$$compile(\{i \mapsto x_k\} \cup W, V, o) = compile(W, V \cup \{x_k \mapsto i\}, o),$$
if $x_k \notin dom(V)$
$$= compare(i, V(x_k), compile(W, V, o)),$$
otherwise.
$$compile(\{i \mapsto f(p_1, \ldots, p_n)\} \cup W, V, o) =$$
$$bind(i, f, o, compile(W', V, o + n)),$$
where $W' = W \cup \{o \mapsto p_1, \ldots, (o + n - 1) \mapsto p_n\}$
$$compile(\emptyset, \{x_1 \mapsto i_1, \ldots, x_k \mapsto i_k\}, o) = yield(i_1, \ldots, i_k)$$

3. Process for Compiling Patterns into Code Sequences

Now, if a pattern p is compiled into a code sequence starting with the instruction instr, then the set match(p,t,∅) is retrieved by storing t in reg[0], setting pc to instr, and executing the instruction stored in pc. At the moment choose is not relevant, it will be used when we discuss the case of matching against many patterns simultaneously. The instruction bind creates a backtracking point, the idea is to try all $f$-applications in the equivalence class of the term stored in reg[i]. The effect of the backtrack instruction is to pop the top of the backtracking stack, bstack, and modify the state according to the value of top. Listing 4 summarizes the cases for handling top for backtracking:

4. Processing the Contents of Top for Backtracking

There may be a compiler module 112 within the computing system 110. The compiler module may be a sub-module of the generating module 111 or the architecture may be such that the compiler module is a separate module. The compiler has sufficient hardware and software resources to accomplish the task of compiling each of the one or more patterns into a code sequence by employing the exemplary process illustrated in Listing 3.

The abstract machine may terminate when the backtracking stack bstack is empty. For convenience, we define the function cont on instructions. On all above instructions but yield, cont returns next. For example, cont(check (i,t,next))=next. As an example, the pattern $f(x_1,g(x_1,a),h(x_2),b)$ can be compiled 220 in the following code sequence:
  init($f$,check(4,b,bind(2,g,5,compare(1,5,check(6,a,bind (3,h,7, yield(1,7))))))

For certain embodiments described herein, code sequences may be represented using labeled instructions. A labeled instruction will be written as a pair of the form n: instr, where n is the label/address, and instr is the instruction itself.

In method 200, a plurality of labeled instructions is created 230 wherein the instructions correspond to a code sequence corresponding to the one or more patterns. The creation of the labeled instructions, as with the compiling of the code sequences, may be accomplished by the generation module 111 or may be accomplished by a label module 113 to produce labeled instructions 134. For example, label module 113 can label instructions 133 to create labeled instructions 134.

For example, after compiling the labeled instructions, the code sequence above for $f(x_1,g(x_1,a),h(x_2),b)$ may be represented as:
  init($f$,$n_1$),$n_1$ : check(4,b,$n_2$),$n_2$ : bind (2,g, 5,$n_3$),$n_3$ : compare(1,5,$n_4$), $n_4$ : check(6,a,$n_5$),$n_5$ : bind(3,h,7,$n_6$),$n_6$ : yield(1,7)

In the function compile(W,V,o), W (working set) is a mapping from register indices to patterns, V (variables) is mapping from variables to register indices, and o (offset) contains the value of the next available register index. The elements of the working set W can be processed in any order, but in certain embodiments an entry i $\mapsto f(p_1, \ldots, p_n)$ is processed only when W does not contain an entry i$\mapsto$t or i$\mapsto x_k$. In certain embodiments, such as described herein, preference is given to instructions that do not produce backtracking points.

E-Matching Code Trees

The time spent on matching patterns with shared structures may be minimized by combining different code sequences in a code tree. Code trees have been introduced in the context of saturation based theorem provers. Code trees are used for forward subsumption and forward demodulation (e.g., as in a Vampire theorem prover described by Riazanov and Voronkov). The code trees employed by embodiments described herein share some properties but are distinct from the substitution trees described by Graf and Meyer which may be used in saturation based theorem provers. One of the advantages of using code and substitution trees is that matching work common to multiple patterns may be "factored out."

This advantage results in substantial speed improvements over a naive approach that would repeatedly match a term against each pattern.

Method 200 includes combining 240 the labeled instructions into a code tree. For example, the labeled instructions 134 may be combined into a code tree by a combining module 114 or by the generator module 111 or by other suitable modules within the computing system 100. For example, a code tree for a small set of patterns, $\{f(x,g(a,y)), f(x,g(x,y)), f(h(x,y),b), f(h(x,g(x,y)),b)\}$ is shown in Listing 5:

init($f,n_1$)

$n_1$ : choose($n_9,n_2$), $n_2$ : bind(2,g,3,$n_3$)

$n_3$ choose($n_6,n_4$),$n_4$ : check(3,a,$n_5$),$n_5$: yield(1,4)

$n_6$ : choose(nil,$n_7$),$n_7$ : compare(1,3,$n_8$), $n_8$ : yield(1,4)

$n_9$ : choose(nil,$n_{10}$),$n_{10}$: check(2,b,$n_{11}$),$n_{11}$ : bind(1,h,5,$n_{12}$)

$n_{12}$ : choose($n_{14},n_{13}$),$n_{13}$ : yield(5,6)

$n_{14}$ : choose(nil,$n_{15}$),$n_{15}$ : bind(6,g,7,$n_{16}$),$n_{16}$ : compare(5,7,$n_{17}$),$n_{17}$ : yield(5,8)

5. Code Tree for $\{f(x,g(a,y)), f(x,g(x,y)), f(h(x,y),b), f(h(x,g(x,y)),b)\}$

Each line in a code tree may be viewed as node (or code block) in the tree, indentation is used to illustrate a parent-child relationship between nodes. The instruction choose is used to create branches/choices in the tree. The node starting at label $n_1$ ($n_9$) contains the instruction(s) common for matching the first and second (third and forth) patterns.

In E-matching code trees, the yield instruction may also store the quantifier that should be instantiated with the yielded substitution. For illustration, one of the many distinctions between E-matching code trees and other code, substitution, and context trees, include the use of a stack to handle both backtracking and the branching that arise from matching in the context of an E-graph.

In general, to maintain a code tree C for a dynamically changing set of patterns P, it is useful to implement operations for integrating and removing code from the tree. In the context of the embodiments described herein, patterns are added to the code tree when a DPLL(T) engine asserts an atom that represents a quantified formula, and are removed when the DPLL(T) engine backtracks. This usage pattern may simplify the insertion and removal operations. In the embodiments described herein, each function symbol is mapped to a unique code tree headed by an init instruction.

An exemplary method or process for insertion of new patterns into a code tree is shown in Listing 6. This process may be employed within the act of compiling 240 and may be accomplished, for example, in the compiling module 114, within the generator module 111, or another module 115 within the computing system 100.

$insert(init(f, n), f(p_1, \ldots , p_m)) =$ $\quad try(n, \{1 \mapsto p_1, \ldots , m \mapsto p_m\}, nreg(init(f, n)), [init(f, n)], [\,])$ $try(choose(a, n), W, o, C, I) = \bot$, if $C = [\,]$ $\quad = seq(C, firstfit(choose(a, n), W, o))$, $\quad\quad$ if $I = [\,]$, $\quad = branch(C, seq(I, choose(a, n)), W, o)$, $\quad\quad$ otherwise.

-continued $try(yield(i_1, \ldots , i_k), W, o, C, I) = \bot$, if $C = [\,]$, $\quad = branch(C, seq(I, yield(i_1, \ldots , i_n)),$ $\quad\quad W, o)$, otherwise.

$try(instr, W, o, C, I) = try(cont(instr), W, o, C, I\hat{\,}[instr])$, $\quad\quad$ if $compatible(instr, W) = \bot$, $\quad = try(cont(instr), compatible(instr, W),$ $\quad\quad C\hat{\,}[instr], I)$, otherwise.

$firstfit(choose(a, n), W, o) = choose(a, try(n, W, o, [\,], [\,]))$, $\quad\quad$ if $try(n, W, o, [\,], [\,]) \neq \bot$, $\quad = choose(firstfit(a, W, o), n)$, otherwise.

$firstfit(nil, W, o) = choose(nil, compile(W, \emptyset, o))$ $seq([\,], fchild) = fchild$ $seq(check(i, t, n) : I, fchild) = check(i, t, seq(I, fchild))$ $seq(compare(i, j, n) : I, fchild) = compare(i, j, seq(I, fchild))$ $seq(bind(i, f, o, n) : I, fchild) = bind(i, f, o, seq(I, fchild))$ $branch(C, fchild, W, o) =$ $\quad seq(C, choose(choose(nil, compile(W, \emptyset, o)), fchild))$ $compatible(check(i, t, n), \{i \mapsto t'\} \cup W) = W$, if $find(t) = find(t')$ $compatible(compare(i, j, n), \{i \mapsto x, j \mapsto x\} \cup W) = \{i \mapsto x\} \cup W$ $compatible(bind(i, f, o, n), \{i \mapsto f(p_1, \ldots , p_m)\} \cup W) =$ $\quad W \cup \{o \mapsto p_1, \ldots , (o+m-1) \mapsto p_m\}$ $compatible(instr, W) = \bot$, otherwise.

6. Process for Insertion into a E-Matching Code Tree

The function try(instr,W,o,C,I) traverses a code block accumulating instructions compatible (incompatible) with the working set W in the list C (I), it returns ⊥ if the code block does not contain any instruction compatible with W. A code block always terminates with a choose or yield instruction. When the code block is fully compatible (i.e., I is empty), the insertion should continue in one of its children.

In some ways similar to substitution trees, there may be several different ways to insert a pattern. The method presented uses a first fit (function first fit) strategy when selecting a child block. In some implementations and embodiments, all children are inspected and the one with the highest number of compatible instructions is used.

Function seq(C,fchild) returns a code block composed of the instructions in C, whose first child is fchild, branch(C, fchild,W,o) returns a code block composed of the instruction in C, and two children: fchild, and the code block produced by the compilation of the working set W.

Function compatible(instr,W) returns ⊥ if the instruction instr is not compatible with the working set W, otherwise it returns an updated W by factoring in the effect of instr.

Function nreg(c) returns the maximum register index used in the code tree c plus one. The yield instruction may always be considered incompatible because, as mentioned before, each one is associated with a different quantifier.

The init instruction is always compatible because we use a different code tree for each root function symbol. In the context of DPLL(T), removal of code trees follow a chronological backtracking discipline, so it suffices to store old instructions from modified next fields in a trail stack.

By employing the abstract instructions and the methods and processes which are described above, it may be seen that there is a method for determining, creating, and producing an E-matching code tree. Such a method is illustrated by method 200 in FIG. 2. The method includes accessing 210 one or more patterns. For example, referring to FIG. 1, the one or more patterns 181 may be accessed in the form of input 180 to a computing system. The patterns may be accessed from storage 160 accessible to the computing system. The patterns may be accessed through input devices 150 which are available to the computing system. As may be appreciated, the patterns may be accessed by any of a number of methods known in the art.

Method 200 includes compiling 220 the one or more patterns into a code sequence. For example, the compiler module 112 may be used to compile the one or more patterns into the code sequences 132. The code sequence 132 may comprise the instructions 133 as detailed, above, in Listings 2 and 4. The patterns may be compiled into code sequences by employing the process as detailed in Listing 3. There may be a compiler module 112 within the computing system 110. The compiler module 112 may be a sub-module of the generating module or the architecture may be such that the compiler module is a separate module. The compiler has sufficient hardware and software resources to accomplish the task of compiling each of the one or more patterns into a code sequence.

Method 200 also includes labeling 230 the one or more instructions in a code sequence wherein the code sequence corresponds to the one or more patterns. Labeling the instructions 230, as with the compiling of the code sequences, may be accomplished by the generation module 111 or may be accomplished by a label module 113. The labeled instructions 134 may be used by later steps in method 200 or may be stored for subsequent use.

Method 200 also includes combining 240 the labeled instructions into a code tree wherein the tree corresponds to the common structure of the one or more patterns. As depicted in FIG. 1, there may be a combining module 114 which combines the labeled instructions into a code tree.

A code tree may be assembled in this manner. Once assembled, the code tree may then be recorded 250 in a computer-readable medium for use in another process or step or for later retrieval. The code tree may be recorded in non-volatile storage 160, may be recorded at some destination accessible via a network 170, or may be issued as output as depicted in FIG. 1. The code tree 191 may also be output via some other output 190 in an appropriate format.

One of the uses anticipated for the determined and generated code tree is to be used in E-matching for SMT solvers. E-matching may be performed on the resulting code tree during a theorem proving process.

As has been described, the instructions used to compile 220 the code sequences from the patterns may be taken from the set init, bind, check, compare, choose, yield, and backtrack. This list of instructions are illustrated and detailed in Listing 2.

Further instructions may also be employed in certain embodiments and in certain circumstances. These instructions may comprise those instructions illustrated and detailed in Listing 4.

When the patterns are compiled 220, in certain embodiments they may be compiled by performing the method or process which is described in Listing 3. This compiling may be accomplished by a compiling module within the computing system 110. The module may be a stand alone module or may be a part of a generating module as depicted in FIG. 1.

Once patterns have been compiled into code sequences, the code sequences may be inserted into an E-matching code tree by performing the method or process described in Listing 6. It should be noted that an E-matching code tree may begin with one pattern and then additional patterns may be inserted into the tree incrementally by compiling the patterns into code sequences and inserting them into the tree using the process of Listing 6.

As an example, in one particular embodiment, given a set of three patterns, {p1, p2, p3}, the three patterns may be compiled and inserted into an E-matching code tree by compiling p1 and inserting the p1 code sequence into an empty tree using the process of Listing 6. Pattern p2 may then be compiled into a p2 code sequence and then inserted into the tree (which now includes both p1 and p2). The process may then be iteratively repeated wherein the pattern p3 is compiled into a code sequence and the p3 code sequence is inserted into the tree. This process may be illustrated by the following sequence of steps:

```
code_tree=empty;
code_sequence=compile(p1);
code_tree=insert(code_seq, code_tree);
code_sequence=compile(p2);
code_tree=insert(code_seq, code_tree);
code_sequence=compile(p3);
code_tree=insert(code_seq, code_tree);
```

The resulting code tree would then include the code sequences having been compiled from each of the patterns {p1, p2, p3}. In a particular embodiment, the methods and processes used would be the process of Listing 3 for compiling the patterns into code sequences and the process of Listing 6 for the insertion of the code sequences into the tree.

As another example, in one particular embodiment, the process detailed in listing 6, above, illustrates another example wherein the compile and insertion steps may be performed essentially simultaneously and iteratively. This is illustrated in FIG. 2 by the process 260 depicting the acts of compiling 220, labeling 230, and combining 240 as elements of another process. In this process, as, for example, is detailed in Listing 6, each of compiling 220, labeling 230, and combining 240 may be done essentially simultaneously or iteratively as part of the process 260.

Inverted Path Index

Figure 3:
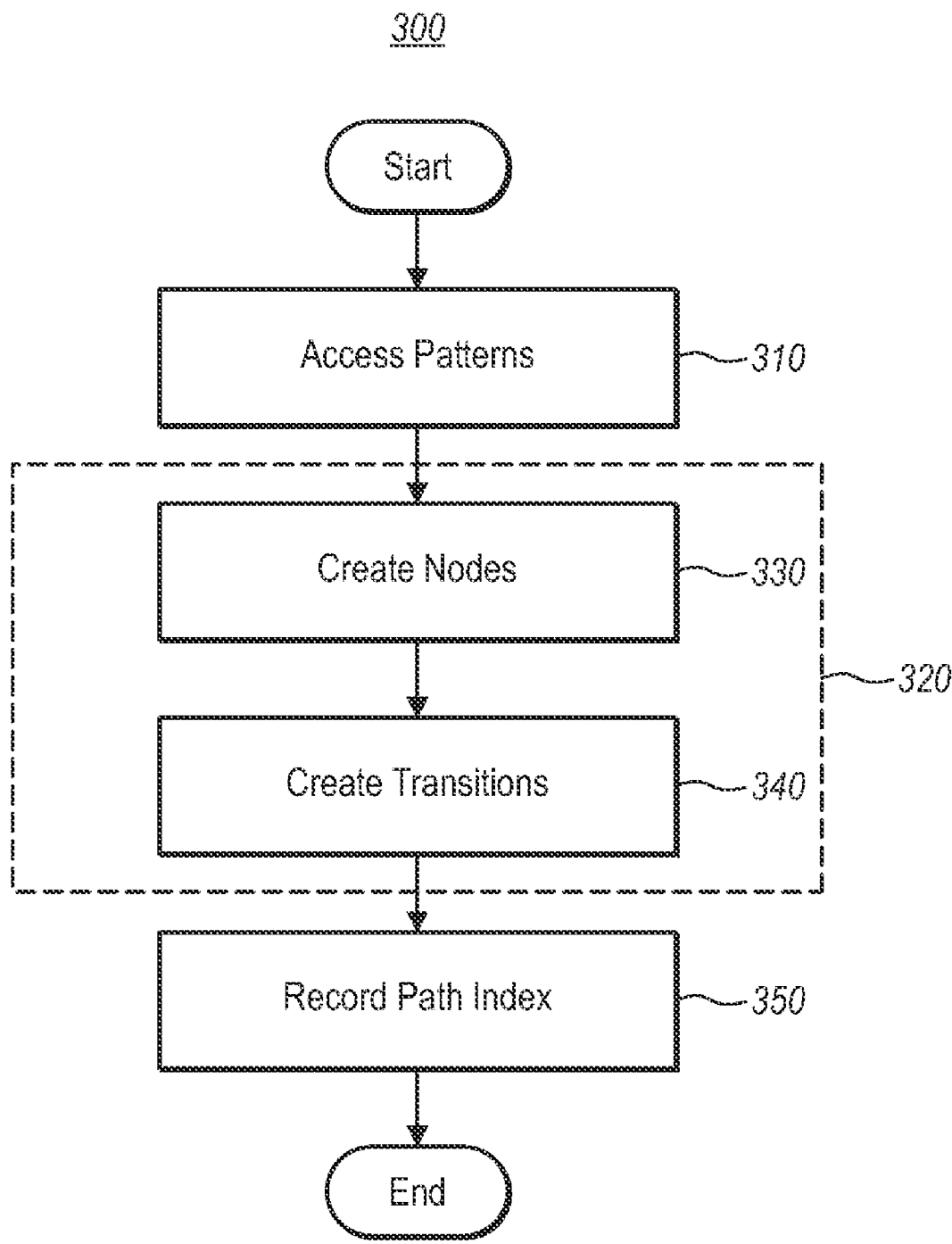
FIG. 3 illustrates a method for the creation of an inverted path index.

Embodiments described herein also include the creation of an inverted path index which may be useful in making theorem proving and E-matching more efficient. It should be noted that other uses for inverted path indexes described herein do exist and the reference to theorem proving and E-matching should be considered illustrative and should not be considered limiting in any way. A method 300 for creating an inverted path index is illustrated by FIG. 3.

Inverted path indexes may be useful because of new potential matches which are generated during theorem proving. For example, the operation union($t_1,t_2$) which is applied during theorem proving and quantifier instantiation has a potential side-effect of producing new matches. For example, a term $f(a,b)$ matches the pattern $f(g(x), y)$ with a potentially new substitution whenever the operation union(a,g(c)) is executed.

The Simplify theorem prover, for example, uses two techniques to identify new terms and pattern that become relevant for matching: mod-time optimization and pattern-element optimization. Mod-time optimization is used to identify relevant terms, and is based on the observation that the operation union($t_1$, $t_2$) may change the set of terms congruent to $t_p \in \{\text{ancestors}(t_1) \cup \text{ancestors}(t_2)\}$.

The time needed to traverse the ancestors of a term t may be minimized by marking already visited terms. Marks may be removed after every round of matching. By employing this approach, it has been found that most of the ancestors do not produce new matches but the costs and overhead of traversing them, both in time and resources, is significant.

Pattern-element optimization may then be used to identify relevant patterns. It is useful to identify when a union operation may or may not be relevant for a particular pattern.

Creation of an inverted path index may be useful in pattern-element optimization to identify relevant patterns. To identify relevant patterns, it is useful to know the relationship of function symbols within patterns during theorem proving.

A pair of function symbols (f, g) is a parent-child pair (pc-pair) of a pattern p, if p contains a term of the form:

f( . . . , g( . . . ), . . . )

A pair (which are not necessarily distinct) of function symbols (f, g) is a parent-parent pair (pp-pair) of a pattern p if p contains two distinct occurrences of the variable x of the form:

f( . . . , x, . . . ), g( . . . x, . . . )

A union($t_1$, $t_2$) is pc-relevant for some pc-pair (f, g) of a pattern p whenever:

(parents$_f$($t_1$)≠∅∧apps$_g$($t_1$)≠∅)∨(parents$_f$($t_1$)≠∅∧apps$_g$($t_1$)≠∅).

A union($t_1$, $t_2$) is pp-relevant for some pp-pair (f, g) of a pattern p whenever:

(parents$_f$($t_1$)≠∅∧parents$_g$($t_2$)≠∅)∨(parents$_f$($t_2$)≠∅∧parents$_g$($t_1$)≠∅).

Assuming that any ground term occurring in a pattern is viewed as a constant symbol, then a union($t_1$, $t_2$) cannot produce any new instances for a pattern p if it is not relevant for any pc-pair or pp-pair of p. The cost of this optimization is minimized by using approximated sets. These are also known as Bloom filters, which are like real sets except that membership and overlap tests may return false positives. That is, all the relevant elements are members of the sets but the sets may contain elements which a not necessary.

Each equivalence class representative t is associated with two approximated sets of function symbols, funs(t) and pfuns(t), where funs(t) is the approximated set of function symbols in class(t), and pfuns(t) is the approximated set of function symbols in parents(t).

Assuming that any ground term occurring in a pattern is viewed as a constant symbol, then a union($t_1$, $t_2$) cannot produce new instances for a pattern p if it is not relevant for any pc-pair or pp-pair of p. The cost of this optimization is minimized using approximated sets (as they are termed in ref2). These are also known as Bloom filters, which are like real sets except that membership and overlap tests may return false positives. Each equivalence class representative t is associated with two approximated sets of function symbols, funs(t) and pfuns(t), where funs(t) is the approximated set of function symbols in class(t), and pfuns(t) is the approximated set of function symbols in parents(t).

Even with mod-time and pattern-element optimizations, many of the matches which are found are still redundant. Certain embodiments herein employ a new technique to identify new terms and patterns that become relevant for matching.

An inverted path string over a signature Σ is either the empty string Λ, or $f.i.\pi$, where π is an inverted path string, $f \in \Sigma$, and i is an integer. Put another way, inverted path strings can be viewed as a child-to-root path. For example, the inverted path string g.1.f.2 is a path to term $f(a,g(h(x),c))$ from subterm h(x). That is, h(x) is the 1st parameter of g(h(x),c) and g is the 2nd parameter of f(a,g(h(x),c)).

Given a set of terms T and an inverted path string π, collect (π,T) is the set of ancestor terms reached from T following the path π. This set comprises a super-set of terms that participate in new E-matches after a union operation. We furthermore seek a sufficiently tight set to avoid redundant E-matching calls.

The function collect can be formally defined as:

collect(Λ,T)=T collect($f.i.\pi$,T)=collect(π,{f($t_1$, . . . , $t_n$)|f($t_1$, . . . , $t_n$)∈parents$_{f,i}$(t),t∈T})

For example, suppose pfuns($t_1$)={f} funs($t_2$)={g} and h(x, $f(g(y),a)$) is a pattern. Then, collect(h.2.f.1,{$t_1$}) would contain all the terms that may produce a new instance for h(x, f (g(y), a)) after executing union($t_1$,$t_2$).

Collecting the set of potentially useful candidates for matching per pattern would do a considerable amount of unnecessary work when a set of patterns share portions of the inverted paths. In consideration of this, in certain embodiments described herein, repeated prefixes from inverted path strings are determined and shared in an inverted path index.

Method 300 illustrated in FIG. 3 illustrates a method for creating an inverted path index. To create in inverted path index, method 300 includes accessing 310 patterns. Such patterns 181 may be accessed through input 180 to a computing system 110 or may be retrieved from storage 160, accessed from a network 170, or be accessed through some other input device.

An inverted path index has the form of a tree τ. One such tree is given, for example, by FIG. 4. The nodes of the tree τ consist of a list of branches pointing to children together with a set of patterns (corresponding to a code tree) that share the path down to the node. Thus, a node may be of the form ⟨[$f_1.i_1,\tau_1$, . . . , $f_k.i_k.\tau_k$], P⟩, where $\tau_j$ are nodes, $f_j.i_j$ are different function, integer pairs, and P is a set of patterns. An example of an inverted path index (tree) for the patterns {f(f(g(x),a),x), h(c,f(g(y),x)),f(f(g(x),b),y), f(f(a,g(x)),g(y))}, and the parent-child pair (pc-pair) {f, g} is given by the inverted path index (tree) illustrated in FIG. 4.

Adapting a definition of collect, as above, to inverted path indices may then be given by:

$$collect(\langle [f_1 \cdot i_1 \cdot \tau_1, \ldots f_k \cdot i_k \cdot \tau_k], P \rangle, T) = \{(P, T) \mid P \neq \emptyset\} \cup \bigcup_{j=1}^{k} collect(\tau_j, \{f_j(t_1, \ldots, t_n) \mid f_j(t_1, \ldots, t_n) \in parents_{f_j \cdot i_j}(t), t \in T\})$$

Inverted path indices are particularly useful in situations where there is, for example, different instances of frame axioms using similar patterns as, for example:

$f(t_1,y,g(z))$, . . . , $f(t_n,y,g(z))$

Accordingly, method 300 can include accessing 310 one or more patterns and a pair which comprise a patent and a child within the one or more patterns. The one or more patterns may be accessed through input 180 to the computer system, may be accessed through input devices 150, may be retrieved from storage, may be accessed from a facility accessible over a network 170, or the like.

An inverted path index may then be generated 320 by creating 330 nodes within a tree comprising a list of branches and a set of patterns such that the nodes and branches correspond to a path from the parent to the child. The generating of the inverted path index may be accomplished by a generator module 111 within the computing system 110, by an index module 116, or by another module 115 within the computing system 110. Creating nodes 330 within a tree may be accomplished by the generating module or may be accomplished by an index module 116 or by another separate module 115 as depicted in FIG. 1. As may be appreciated, each function of the method or process may be performed by a separate module or may be performed by a larger more encompassing module within the computing system such as the generating module.

The transitions of the nodes would be created 340 corresponding to the parent-child relationship of the patterns. The creation of the transitions and determination of the correct transitions and the labeling of the node transitions may also be performed by a separate component or module 115 within the computing system or may be performed by a larger, more encompassing module or component such as the generator module 111. Once an inverted path index created, it may be recorded 350 in a computer-readable storage media for subsequent use or retrieval.

Figure 4:
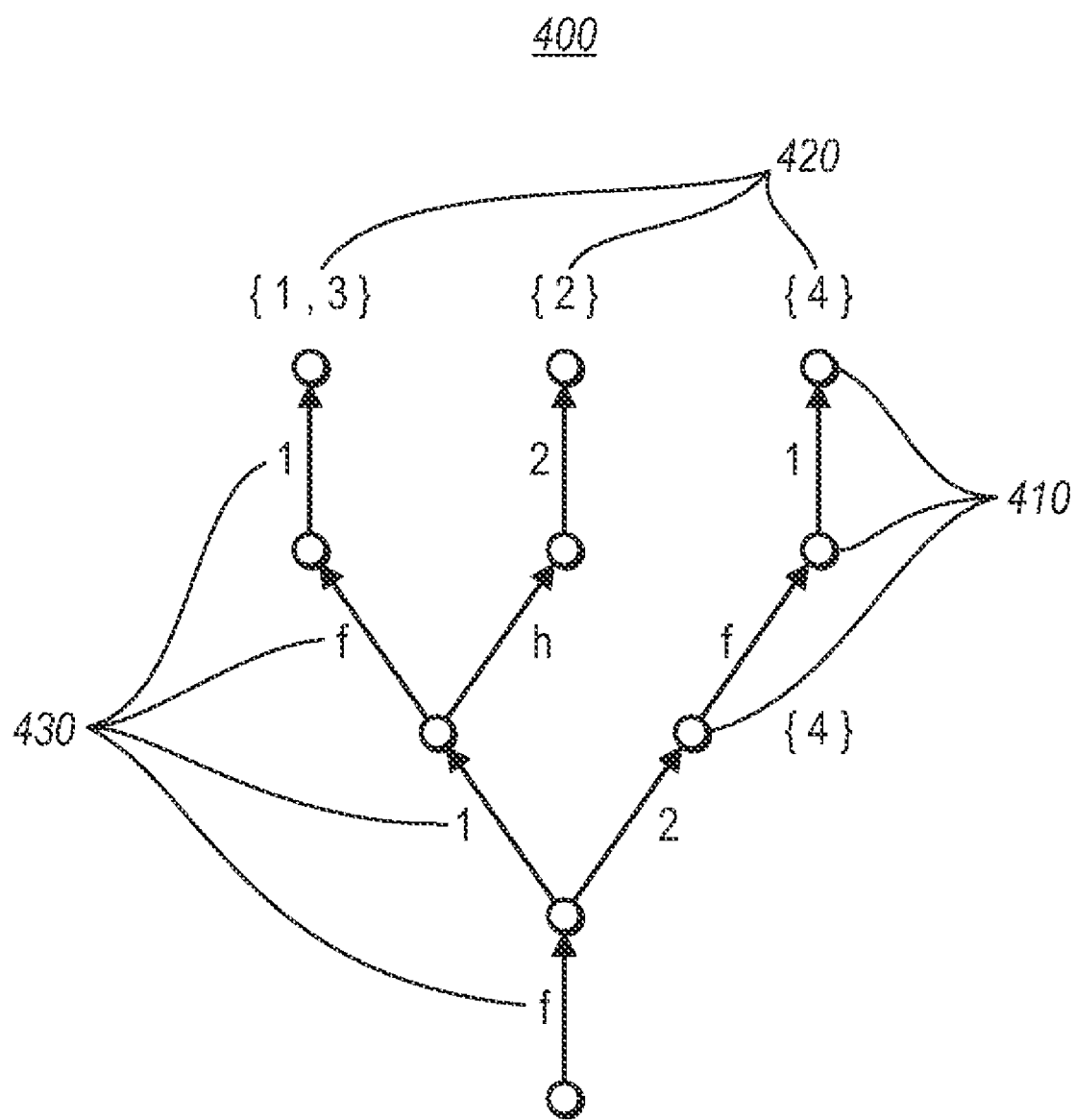
FIG. 4 illustrates an example inverted path index generated by embodiments described herein.

As an example, FIG. 4 illustrates an inverted path index 400 which has been created in such a manner for the set of patterns
{f(f(g(x),a),x), h(c,f(g(y),x)), f(f(g(x),b),y), f(f(a,g(x)),g(y))}.
If the paths are identified by the given numbers
1: f(f(g(x),a),x), 2: h(c,f(g(y),x)), 3: f(f(g(x),b),y), 4: f(f(a,g(x)),g(y)),
then the inverted path index 400 illustrates the paths from f to g with the numbers in curly braces 420 indicating which paths are illustrated by the indicated nodes.

Once an inverted path index has been created, generated, or recorded, it may be determined from the inverted path index an inverted path string corresponding to a term and a sub term of the one or more patterns.

As an example, each of the transitions 430 between the nodes 410 within the index tree 400 is labeled with the symbol or the relevant parameter position indicator. In this manner, it may be seen that the index tree 400 of FIG. 4 is generated from the patterns
{f(f(g(x),a),x), h(c,f(g(y),x)), f(f(g(x),b),y), f(f(a,g(x)),g(y))}.
The path from f to g is given by f.1.f.1 in patterns 1 and 3 (by following the path to the node indicated in the curly braces 420). The path from f to g is given by f.1.h.2 for pattern 2. And the path from f to g is given by f.2 and by f.2.f.1 for pattern 4.

A set of ancestor terms may further be determined from a set of terms by using the inverted path string. By searching the inverted path index, the inverted path string may be located and the ancestors to the inverted path string may be determined.

Further, a set of ancestor terms may be determined from the inverted path index from a term (or set of terms). By determining the set or sets of ancestor terms, the inverted path index may be used to determine matches, as above, after a union operation.

Also, as above, the set or sets of ancestor terms which may be determined by using the inverted path index and/or an inverted path string may then be used as input or as a basis for further E-matching.

Additional Instructions

In some embodiments, a set of quantified variables is instantiated only when a set of patterns, called a multi-pattern is matched. In order to support multi-patterns, a new kind of instruction may also be added: continue. The semantics of this and other supporting instructions is given in Listing 7:

| | |
|---|---|
| continue(f,o,next) | push(bstack, (choose − app,o,next,apps(f),1)) |
| | pc := backtrack |
| join(i,π,o,next) | push(bstack, |
| | (choose − app,o,next,collect(π,{reg[i]}),1)) |
| | pc := backtrack |
| filter(i,fs,next) | If fs ∩ funs(reg[i]) ≠ ∅ Then |
| | pc := next |
| | Else pc := backtrack |

7. Semantics of Additional Instructions

The instruction continue ($f$,o, next) chooses an $f$-application and updates the registers from o to o+arity($f$)−1 with its arguments. For example, the multi-pattern {$f$(x,a,y),g(z,x)} is compiled into the following code sequence:
init($f$,$n_1$), $n_1$ : check(2,a,$n_2$), $n_2$ : continue(g,4,$n_3$), $n_3$ : compare(1,5,$n_4$), $n_4$ : yield(1,3,4)

At times, some amount of time can be spent matching multi-patterns during E-matching and theorem proving. This may be caused by the instruction continue ($f$,o,next) being re-executed an excessive number of times when the number of $f$-applications in an E-graph is significantly large. When the code sequence above is considered, a g-application chosen by the continue instruction may only be useful to yield an instance if the compare instruction succeeds. That is, the second argument of the chosen g-application is in the same equivalence class of the term stored in register 1.

In consideration of this, another instruction may be added for compiling multi-patterns: join. The semantics of this instruction is also given in Listing 7. The instruction join(i,π, o,next) chooses a candidate from a set of terms reachable from the term stored in register i following the inverted path string π. When a multi-pattern {$p_1$, . . . , $p_n$} is compiled, if $p_i$ contains a variable x that also occurs in $p_j$ for j<i, then a join can be used instead of a continue instruction, and π is the path from x to $p_i$. If there is more than one variable, then we select the one with the shallowest path. Using the join instruction, the multi-pattern {$f$(x,a,y),g(z,x)} may then be compiled into the following code sequence:
init($f$,$n_1$),$n_1$ : check(2,a,$n_2$),$n_2$ : join(1,g.2,4,$n_3$),$n_3$ :yield (1,3,4)
init($f$,$n_1$), $n_1$ : check(2,a,$n_2$), $n_2$ : join(1, g.2, 4, $n_3$), $n_3$: yield(1, 3, 4)
The instruction compare(1,5,$n_4$) may then be unnecessary, since the join will only select g-applications for which the second argument is in the same equivalence class of the term stored in register 1.
Filters If the pattern $f$(g(x),h(y)) is considered, it is compiled (as described above) into the following sequence of instructions:
init($f$,2,$n_1$),$n_1$ : bind(1,g,3,$n_2$),$n_2$ : bind(2,h,4,$n_3$),$n_3$ : yield (3,4)

If it is desired to match term $f$(a,b), and class(a) contains n g-applications, but class(b) does not contain any h-application. In this scenario, a lot of unnecessary or unfruitful work may be performed when interpreting the instructions above. The second bind will fail n times.

In certain embodiments, this situation may be addressed by introducing a new instruction that performs forward pruning: filter. The semantics of this new instruction is also shown in Listing 7. The idea of the new instruction is to use the approximated set funs(t) to quickly test whether the equivalence class of a term t contains an $f$-application or not. Using the new instruction, the pattern $f$(g(x),h(y)) may be compiled as:

init($f$,$n_1$),$n_1$ : filter(1,{$g$},$n_2$),$n_2$ : filter(2,{$h$},$n_3$), $n_3$ : bind(1,$g$,3,$n_4$), $n_4$ : bind(2,$h$,4,$n_5$),$n_5$ : yield(3,4)

The filter instruction may also used for saving unnecessary backtracking prior to a sequence of choose instructions each followed by a bind to a function in $f$s.

CONCLUSION

Although certain embodiments have been described, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising at least one computer processor and computer-readable storage media, a method for determining an E-matching code tree from one or more patterns, the method comprising:
   accessing one or more patterns;
   compiling each of the one or more patterns into a code sequence, each code sequence comprising one or more instructions, each of the one or more instructions being from a set of instructions comprising init, bind, check, compare, choose, yield, and backtrack, the set of instructions comprising an E-matching code tree abstract machine;
   labeling each of the one or more instructions in the each code sequence resulting from compiling each of the one or more patterns, each labeled instruction comprising a pair of the form n:instr, where n is a label, and instr is the instruction itself;
   combining the labeled instructions into a code tree, the tree corresponding to the common structure of the one or more patterns; and
   recording the code tree in a computer-readable storage medium.

2. The method of claim 1 wherein compiling each of the one or more patterns into a code sequence comprises executing the pattern compiling algorithm.

3. The method of claim 1 wherein combining the labeled instructions into a code tree comprises performing an insertion algorithm.

4. The method of claim 1 further comprising performing E-matching on the generated code tree.

5. The method of claim 1 wherein the instructions further comprise continue, join, and filter.

6. The method of claim 5 further comprising using the generated code tree and checking a set of branch points using a partial filter.

7. A system comprising one or more computer processors and computer-readable media upon which is recorded computer-executable instructions which, when executed, perform a method comprising:
   accessing one or more patterns;
   compiling each of the one or more patterns into a code sequence, each code sequence comprising one or more instructions, each of the one or more instructions being from a set of instructions comprising init, bind, check, compare, choose, yield, and backtrack, the set of instructions comprising an E-matching code tree abstract machine, the one or more instructions comprising parameters which are tokens from the one or more patterns;
   creating a plurality of labeled instructions, the instructions corresponding to a code sequence corresponding to the one or more patterns and resulting from compiling each of the one or more patterns, each labeled instruction comprising a pair n:instr, where n is a label, and instr is the instruction itself;
   combining the labeled instructions into a code tree, the tree corresponding to the common structure of the one or more patterns;
   determining an inverted path index for the one or more patterns; and
   determining a set of ancestor terms from a set of terms using the inverted path index and an inverted path string.

8. The system of claim 7 wherein an E-graph is maintained within the computer-readable media.

9. The system of claim 7 wherein the inverted path index corresponds to a parent-child pair of function symbols within the one or more patterns.

10. The system of claim 7 wherein the inverted path index corresponds to a parent-parent pair of function symbols within the one or more patterns.

11. The system of claim 7 wherein the set of ancestor terms is used to determine when a union operation is relevant to a pattern.

12. The system of claim 7 wherein the set of ancestor terms is used to identify a set of terms and patterns which become relevant for matching after a union operation.

* * * * *